United States Patent Office 3,472,866
Patented Oct. 14, 1969

3,472,866
SUBSTITUTED BENZIMIDAZOLE COMPOUNDS
Geoffrey Tattersall Newbold, Saffron Walden, and Albert Percival, Hauxton, England, assignors to Fisons Pest Control Limited, Harston, England
No Drawing. Filed Jan. 12, 1967, Ser. No. 608,759
Claims priority, application Great Britain, Jan. 13, 1966, 1,574/66
Int. Cl. C07d 49/38
U.S. Cl. 260—309.2
5 Claims

ABSTRACT OF THE DISCLOSURE

Substituted benzimidazole compounds of the formula

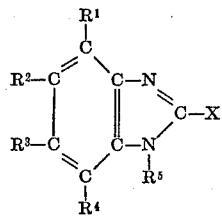

wherein in the above formula $R^1$, $R^2$, $R^3$ and $R^4$ are selected from the group consisting of hydrogen, alkyl, hydroxy, alkoxy, aryloxy, nitro, halogen, pseudo-halogen, substituted alkyl, carboxy, carboxy ester, carboxy amide, N-substituted carboxyamide, N-disubstituted carboxy amide; amino, mono-substituted amino, di-substituted amino, thiol, alkylthio and oxygenated derivatives thereof, sulphonic acid and esters and amides and oxygenated derivatives thereof, substituted amides, and a heterocyclic ring attached to the benzimidazole system through a nitrogen atom, radicals, where X is selected from the group consisting of trifluoromethyl and pentafluoroethyl and where $R^5$ is selected from the group consisting of aralkyl and substituted aralkyl are biocidally active and are utilized in the formulation of biocidally active compositions.

The present invention relates to certain substituted benzimidazoles which have been found to possess biocidal activity, to their preparation and to agricultural chemical and related compositions containing the same.

It has been found that the substituted benzimidazoles as hereinafter described are active as pesticides in many fields viz as herbicides, insecticides, molluscicides, fungicides and bactericides; certain members are highly active as herbicides and insecticides.

Accordingly the present invention is for a biocidally active composition which contains as an active ingredient a substituted benzimidazole of the following formula:

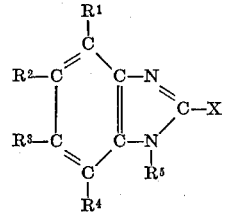

(Formula 1)

wherein the above formula $R^1$, $R^2$, $R^3$ and $R^4$ may be the same or different and are selected from the group comprising hydrogen, alkyl (for example of 1–6 carbon atoms such as methyl, ethyl or propyl), hydroxy, alkoxy (for example methoxy, ethoxy, or butoxy), nitro, halogen (for example chloro, bromo or fluoro), pseudo-halogen (for example cyano, thiocyano, isothiocyano or azido), substituted alkyl (for example trifluoromethyl, chloromethyl, bromomethyl, trichloromethyl, hydroxymethyl, 2-chloroethyl, 2-hydroxyethyl or 2-methoxyethyl), carboxy, carboxy ester, carboxy amide, N-substituted carboxy amide, N-disubstituted carboxy amide, aryloxy (for example phenoxy), amino or mono or di-substituted amino (for example methylamino, dimethylamino, acetylamino, trifluoroacetylamino, benzenesulphonamido, paratoluenesulphonamido, methanesulphonamido), thiol, alkylthio and oxygenated derivatives thereof (for example —$SOR^6$ or $SO_2R^6$ where $R^6$ is alkyl) sulphonic acid and esters and amides thereof and substituted amides (for example phenylsulphamyl, ethylsulphamyl, chloroethylsulphamyl) and a heterocyclic ring attached to the benzimidazole system through a nitrogen atom, radicals, where X is trifluoromethyl or pentafluorethyl, and where $R^5$ is aralkyl or substituted aralkyl (for example benzyl or chlorobenzyl).

The present invention is also for a biocidally active composition which contains a substituted benzimidazole as identified above and at least one material selected from the group comprising wetting agents, inert diluents and solvents.

The present invention is also for the treatment of plants, materials, animals, the soil, land or aquatic areas, which comprises applying thereon or thereto a substituted benzimidazole or a biocidally active composition as defined above. The materials treated according to the invention may be any material susceptible to attack by detrimental organisms such as fabric, paper and wood.

The present invention also comprises the new substituted benzimidazoles of Formula 1, wherein the groups $R^1$, $R^2$, $R^3$, $R^4$ and $R^5$ and X have the significance indicated above.

It has been found that the substituted benzimidazoles according to the invention generally possess biocidal activity. Many of these compounds are useful as insecticides, or as herbicides. The term biocidal activity is to be understood as also covering plant growth and insect attractant activity.

According to a preferred embodiment, the present invention is for compounds of Formula 1, wherein $R^1$, $R^2$, $R^3$, $R^4$, $R^5$ and X have the significance indicated above but where at least one of the groups $R^1$, $R^2$, $R^3$ and $R^4$ is chlorine, bromine, iodine, fluorine, nitro, amino, alkyl or trifluoromethyl, suitably also where $R^5$ is benzyl and where X is trifluoromethyl.

According to one embodiment of the invention, the substituted benzimidazoles as indicated are prepared by reacting the corresponding benzimidazole derivative unsubstituted in the 1-position with a chloroformate, in accordance with the following formula:

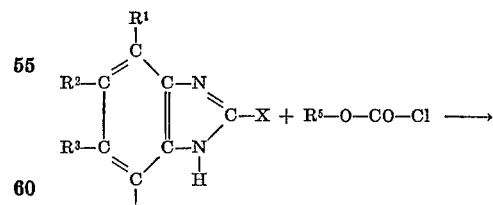

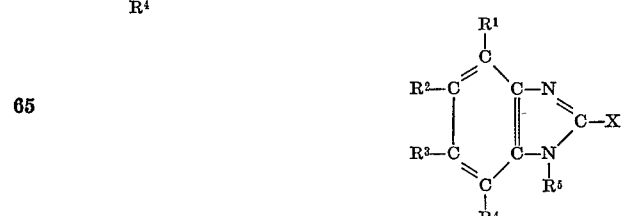

wherein the above formula $R^1$, $R^2$, $R^3$, $R^4$, $R^5$ and X have the significance indicated above, in the presence of an organic base (for example triethylamine) and a solvent (for example acetone).

Alternatively the substituted benzimidazoles may be prepared by reacting the corresponding benzimidazole derivative unsubstituted in the 1-position with the halide of the formula $R^5Z$, where Z is halogen, in the presence of a base (for example potassium carbonate) and a solvent (for example acetone).

In the case of the substituted benzimidazoles bearing an amino group, these are suitably prepared by the reduction of the corresponding nitro-substituted benzimidazole. In the case of the substituted benzimidazoles bearing a nitro group, these are suitably prepared by the nitration of the corresponding substituted benzimidazole.

The substituted benzimidazole may be incorporated into biocidally active compositions, in any of the usual ways, with or without wetting agents and inert diluents.

If desired the substituted benzimidazoles may be dissolved in a water immiscible solvent, such as for example a high boiling hydrocarbon, suitably containing dissolved emulsifying agents so as to act as a self-emulsifiable oil on addition to water.

The substituted benzimidazoles may also be admixed with a wetting agent with or without an inert diluent to form a wettable powder which is soluble or dispersible in water, or may be mixed with the inert diluent to form a solid or powdery product.

Inert diluents with which the substituted benzimidazoles and salts thereof may be incorporated include solid inert media comprising powdered or divided solid materials, for example, clays, sands, talc, mica, fertilizers and the like, such products either comprising dust or larger particle size materials.

The wetting agents used may comprise anionic compound such as for example soaps, fatty sulphate esters such as dodecyl sodium sulphate, fatty aromatic sulphonates such as alkylbenzene sulphonates or butyl naphthalene sulphonate, more complex fatty sulphonates such as the amide condensation product of oleic acid and N-methyl taurine or the sodium sulphonate of dioctyl succinate.

The wetting agents may also comprise non-ionic wetting agents such as for example condensation products of fatty acids, fatty alcohols or fatty substituted phenols with ethylene oxide, or fatty esters or sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethyl-ammonium bromide and the like.

The biocidally active compositions according to the present invention may contain in addition to the substituted benzimidazole or salts thereof, other physiologically active materials such as herbicides, insecticides, fungicides and molluscicides. Insecticidal compositions may contain edible substances attractive to insects such as sugar, molasses and protein hydrolysates, suitably also with specific insect attractants.

The following examples are given to illustrate the present invention.

EXAMPLE 1

A solution of benzyl chloroformate (12.8 g.) in dry acetone (15 ml.) was added dropwise to a mixture of 4,5,6-trichloro-2-trifluoromethyl benzimidazole (14.5 g., 0.05 M) dry triethylamine (7.6 ml.) and dry acetone (40 ml.). After refluxing for 1 hour, the reaction mixture was cooled, the precipitate filtered off and the filtrate evaporated to dryness. The residual oil was taken up in ethanol and allowed to crystallise. The white plates of 1 - benzyl - 4,5,6-trichloro-2-trifluoromethyl benzimidazole were collected and dried (6.8 g., M.P. 148–149°).

$C_{15}H_8Cl_3F_3N_2$ requires: C, 47.40; H, 2.1; Cl, 28.10; N, 7.38%. Found: C, 47.45; H, 1.80; Cl, 28.00; N, 7.50%.

EXAMPLES 2–7

In a similar way to Example 1 the following compounds were prepared: 1-benzyl-4,5-dichloro-2-trifluoromethyl benzimidazole (white crystals)—

$C_{15}H_9Cl_2F_3N_2$ requires: C, 52.20; H, 2.63; Cl, 20.55; N, 8.12%. Found: C, 52.20; H, 2.75; Cl, 20.35; N, 8.30%.

1 - benzyl - 5(6)-nitro-2-trifluoromethylbenzimidazole (M.P. 84–85° C.); 1-benzyl-5,6-dichloro-2-trifluoromethylbenzimidazole (M.P. 139–140° C.); 1-benzyl-4,6-dichloro-2-trifluoromethyl benzimidazole (white plates—M.P. 131–132° C.)—

$C_{15}H_9Cl_2F_3N_2$ requires: C, 52.20; H, 2.63; Cl, 20.55; N, 8.12%. Found: C, 51.90; H, 2.65; Cl, 20.30; N, 8.25%.

1 - benzyl-6-chloro-4-nitro-2-trifluoromethyl benzimidazole (coloured needles—M.P. 129–130° C.)—

$C_{15}H_9ClF_3N_3O_2$ requires: C, 50.65; H, 2.55; Cl, 9.97; N, 11.80%. Found: C, 50.35; H, 2.80; Cl, 10.10; N, 12.10%.

1 - benzyl-4-chloro-6-nitro-2-trifluoromethyl benzimidazole (pale yellow plates—M.P. 153–154° C.)—

$C_{15}H_9ClF_3N_3O_2$ requires: C, 50.65; H, 2.55; Cl, 9.97; N, 11.80%. Found: C, 50.85; H, 2.65; Cl, 10.00; N, 11.9%.

EXAMPLE 8

Peas, mustard, linseed, sugar beet, Condor oats and barley were grown in John Innes potting compost in aluminium pans (7½ ins. x 3¼ ins. area x 2 ins. depth).

When the plants had between 2 and 5 true leaves they were sprayed with an aqueous acetone solution of each of the compounds identified below in aqueous acetone at a rate corresponding to 10 lbs./acre. After 7 days in a controlled environment room at 22° C. with 14 hours per day of illumination of 800 ft. candles and a relative humidity of 75–90%, the plants were examined visually for post-emergent herbicidal effect. The results are tabulated below; 100 indicates complete destruction of the plant, 0 indicates no herbicidal effect.

| Compound | Herbicidal effect | | | | | |
|---|---|---|---|---|---|---|
| | Mustard | Linseed | Peas | Sugar beet | Condor oats | Barley |
| 1-benzyl-4,6-dichloro-2-trifluoromethyl benzimidazole | 98 | 80 | 60 | 98 | 25 | 40 |

EXAMPLE 9

An aqueous suspension containing 1 part of 1-benzyl-4,6-dichloro-2-trifluoromethyl benzimidazole in 1000 parts of water was prepared by diluting a 20% solution in acetone with a 0.05% solution of octylcresol polyethylene oxide condensate in water. This solution was sprayed at a rate equivalent to 50 gallons per acre on to young field beans (*Vicia fabae*) infested with adult apterous vetch aphids (*Megoura viciae*). After treatment, the plants were enclosed in glass cages with gauze tops for ventilation for 24 hours, when all the aphids were found to have been killed.

EXAMPLE 10

An aqueous acetone solution of 1-benzyl-4,5-dichloro-2-trifluoromethyl benzimidazole was sprayed on to 7 cm. diameter discs of cabbage leaves at a rate corresponding to 5 pounds per acre. When the deposit had dried, the discs were placed in 9 cm. petri dishes and each infested with ten second instar larvae of the cabbage white butterfly, *Pieris brassicae*. After 24 hours all larvae were found to be dead.

We claim:
1. A substituted benzimidazole compound of the formula

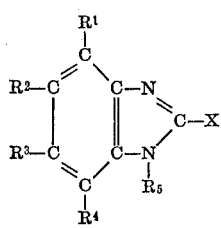

wherein $R^1$, $R^2$, $R^3$, $R^4$ and R each represents a member selected from the group consisting of hydrogen, halogen, nitro, amino, alkyl of 1 to 6 carbon atoms and trifluoromethyl, X represents a member selected from the group consisting of trifluoromethyl and pentafluoroethyl and $R^5$ represents phenyl lower alkyl.

2. A substituted benzimidazole as defined in claim 1 wherein at least one of the groups $R^1$, $R^2$, $R^3$ and $R^4$ is selected from the group consisting of halogen, nitro, amino, alkyl of 1 to 6 carbon atoms and trifluoromethyl.

3. A substituted benzimidazole as defined in claim 1 wherein X represents trifluoromethyl.

4. A compound as defined in claim 1 said compound being 1-benzyl-4,5,6-trichloro-2-trifluoromethyl benzimidazole.

5. A compound as in claim 1, said compound being 1-benzyl-4,5-dichloro-2-trifluoromethyl benzimidazole.

References Cited

UNITED STATES PATENTS

| | | | |
|---|---|---|---|
| 2,004,864 | 6/1935 | Graenacher et al. | 260—309.2 |
| 2,623,879 | 12/1952 | Ringwald et al. | 260—309.2 |
| 2,773,869 | 12/1956 | Leavitt | 260—309.2 |
| 2,811,520 | 10/1957 | Gailliot et al. | |
| 3,036,064 | 5/1962 | Schindler. | |
| 3,192,227 | 6/1965 | Brown et al. | 260—309.2 |

FOREIGN PATENTS 659,384  8/1965  Belgium.

OTHER REFERENCES

Braz et al.: Chem. Abst., vol. 62, col. 14657 (1965).

Houben-Weyl: Methoden der Organischen Chemie, vol. 11/1, Stickstoffverbindungen II, p. 950, Stuttgart, Thiene, 1957.

Morgan: Jour. Chem. Soc. (London), 1961, pp. 2344–5 relied on.

Ozegowski et al. Chem. Abst., vol. 59, col. 6383 (1963).

Wagner et al.: Synthetic Organic Chemistry, p. 646, New York., Wiley, 1953.

JOHN D. RANDOLPH, Primary Examiner

NATALIE TROUSOF, Assistant Examiner

U.S. Cl. X.R.

71—92; 260—463, 99; 424—273